(12) United States Patent
Löf (10) Patent No.: US 8,727,676 B2
(45) Date of Patent: May 20, 2014

(54) DOUBLE-SIDED INDEXABLE TURNING INSERT

(75) Inventor: Ronnie Löf, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 381 days.

(21) Appl. No.: 13/213,326

(22) Filed: Aug. 19, 2011

(65) Prior Publication Data

US 2012/0051855 A1     Mar. 1, 2012

(30) Foreign Application Priority Data

Aug. 25, 2010 (SE) .................................. 1050870

(51) Int. Cl.
*B23B 27/22* (2006.01)
*B23C 5/20* (2006.01)

(52) U.S. Cl.
USPC ........................................ 407/114; 407/113

(58) Field of Classification Search
USPC ............................. 407/113, 114, 115, 116, 42
See application file for complete search history.

(56) References Cited

U.S. PATENT DOCUMENTS 4,411,565 A   10/1983   Hazra et al.
5,000,626 A    3/1991   Bernadic et al.

(Continued)

FOREIGN PATENT DOCUMENTS

| EP | 0 494 646 A1 | 7/1992 |
|---|---|---|
| EP | 0730925 | 6/2000 |
| JP | 2006-110667 | 4/2006 |
| JP | 2009-113197 | 5/2009 |

OTHER PUBLICATIONS

European Search Report for European Patent Application No. 11177940.1, dated Dec. 13, 2013.

(Continued)

*Primary Examiner* — Will Fridie, Jr.

(74) *Attorney, Agent, or Firm* — Morgan, Lewis & Bockius LLP (57) ABSTRACT

A double-sided, indexable turning insert having a polygonal basic shape, including at least three corners, and an upper side and an under side, in which first and second opposite, plane support surfaces are included, The plane support surfaces are delimited inside outer contour lines, and parallel to each other and to a neutral plane (NP) situated halfway between the plane support surfaces. A plurality of cutting edges are along the upper side and the under side, each one of which includes a nose edge and two main edges converging toward the nose edge, all nose edges along the individual upper or under side being situated in a common reference plane (RP) that is depressed in relation to the support surface. A circumferential chip surface is adjacent to a peripheral clearance surface, the individual main edge being formed between the chip surface and a part of the clearance surface extending between two corners, and the individual nose edge being between the chip surface and a convex part of the clearance surface. A flank surface, which slopes toward the chip surface, extends from the outer contour line of the support surface. The individual main edge, as viewed in side elevation, declines from a highest point adjacent to the nose edge toward a lowest point between two corners, a level difference between the support surface and the lowest point of the main edge amounts to at most 0.5 mm, and the rake angle ($\alpha$) of the individual cutting edge is acute along the entire extension of the cutting edge.

10 Claims, 8 Drawing Sheets

(56) References Cited

U.S. PATENT DOCUMENTS 5,082,401 A * 1/1992 Niebauer ............... 407/114
5,249,894 A * 10/1993 Bernadic et al. ......... 407/114
6,234,726 B1 * 5/2001 Okada et al. ........... 407/114
6,599,061 B1 * 7/2003 Nelson ................. 407/114

OTHER PUBLICATIONS

Written Opinion for European Patent Application No. 11177940.1, dated Jan. 16, 2014.

* cited by examiner

DOUBLE-SIDED INDEXABLE TURNING INSERT

This application claims priority under 35 U.S.C. §119 to Swedish Patent Application No. 1050870-3, filed on Aug. 25, 2010, which is incorporated by reference herein in its entirety.

FIELD OF THE INVENTION

The present invention relates generally to a double-sided, indexable turning insert having a polygonal basic shape of the type that includes at least three corners as well as an upper side and an under side, in which a pair of opposite, plane support surfaces are included, which are delimited inside outer contour lines, and are parallel to each other and to a neutral plane situated halfway between the same. A plurality of cutting edges are located along the upper side as well as the under side and each one of which includes a nose edge and two main edges converging toward the same, all nose edges along the individual upper or under side being situated in a common reference plane that is depressed in relation to the support surface. A circumferential chip surface is adjacent to a peripheral clearance surface. The individual main edge is formed between the chip surface and a part of the clearance surface extending between two corners, and the individual nose edge between the chip surface and a convex part of the clearance surface. A flank surface, which slopes toward the chip surface, extends from the outer contour line of the support surface. The individual main edge—as viewed in side elevation—declines from a highest point adjacent to the nose edge toward a lowest point between two corners.

BACKGROUND OF THE INVENTION

A turning insert of the type generally mentioned above is previously known by U.S. Pat. No. 4,411,565.

Turning of workpieces of metal or composites is a machining method that is used to manufacture mass-produced, inexpensive products as well as more unique and expensive products. Among other things, thin-walled rings included in jet engines for, for instance, airplanes belong to the latter category. Such rings are assembled with more rings to form a combustion chamber in the engine, and may have a diameter of 2000 mm or more, a width of approx. 100 mm, as well as a thickness of 4-5 mm. The material of the ring has to be heat-resistant and hard, and therefore the same is in practice difficult to machine. A requirement difficult to master is that the dimensional accuracy of the ring has to be meticulous, at the same time as the turned surfaces must not include any defects at all that risk forming points of crack initiation, which during operation could cause disastrous engine breakdowns. In order to avoid all possible points of crack initiation, it is, among other things, necessary that the individual turning operation, e.g., the machining of the inside of the ring (or the outside thereof), has to be performable in a single pass without any interruptions. Namely, if the turning tool in question, and above all the replaceable turning inserts thereof, would fail during the operation in progress before this has been concluded, there are no practical possibilities to avoid surface defects (so-called marks), which may cause crack formations in the ring. Another requirement is that the completed, generated surface of the ring should be dimensionally accurate and as smooth as possible. Therefore, it is important that the concluding pass (if several passes are required) is carried out in a gentle and predictable way. In this connection, it should be pointed out that the requirements of dimensional accuracy in the turning of rings of the kind in question usually are in the order of 0.01 mm.

From what has been said above, it is seen that double-sided turning inserts, which should be able to fulfill the task in question, have to have a service life that is sufficient in order to be able to machine the individual surface of the ring in a single pass without interruptions. A careful machining requires moreover that the turning insert provides good chip control, above all so far that the removed chips must not contact the generated surface. In other words, the chip has to be directed away from the generated surface and most preferably be broken into smaller fragments.

Figure 1:
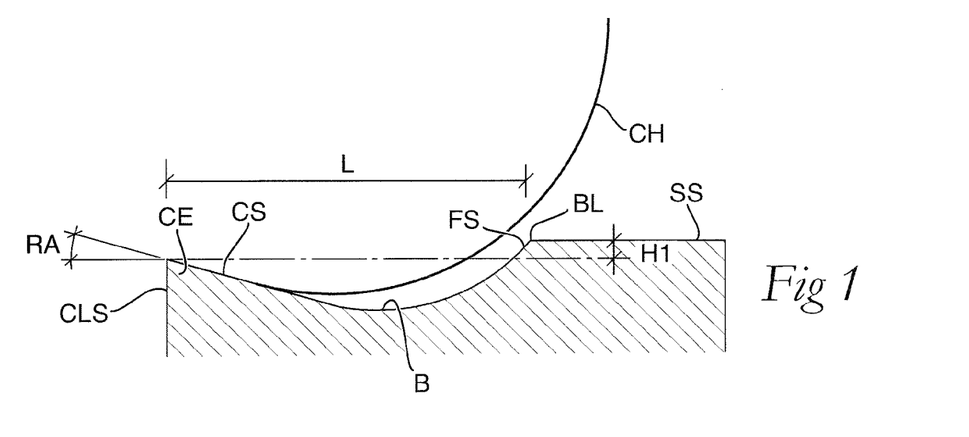
FIG. 1 schematically illustrates phenomena in connection with turning.
Figure 2:
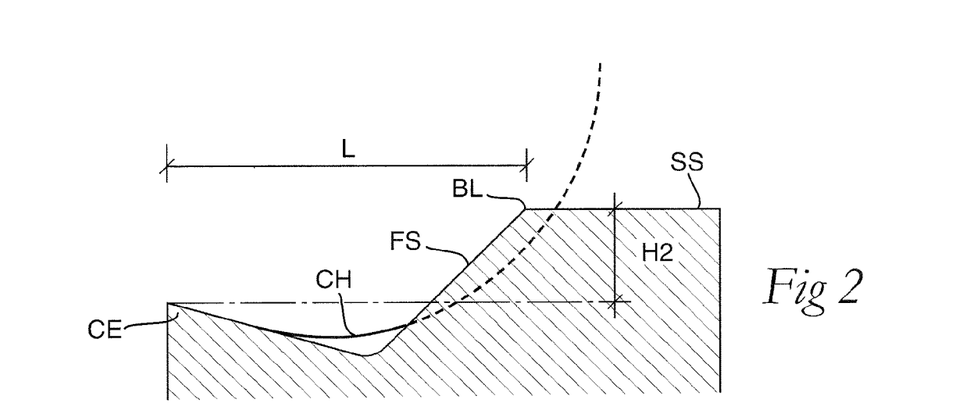
FIG. 2 schematically illustrates phenomena in connection with turning.
Figure 3:
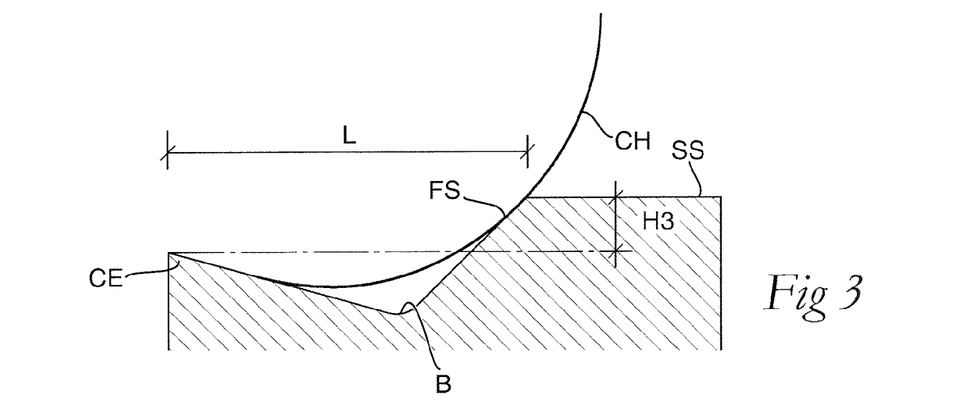
FIG. 3 schematically illustrates phenomena in connection with turning.

In order to facilitate the understanding of the nature of the invention, reference is initially made to the accompanying FIGS. 1-3, which schematically illustrate certain phenomena having a particular interest in connection with turning. In FIGS. 1-3, CE designates a cutting edge that has a positive cutting geometry and is delimited between a chip surface CS and a clearance surface CLS. The surfaces CS and CLS meet each other at an acute angle, and therefore the rake angle RA of the cutting edge becomes smaller than 90°. In the example, RA amounts to approx. 15°. The bearing surface SS transforms, via a boundary line BL, into a flank surface FS that slopes toward a bottom B, which forms a transition to the chip surface CS. The distance between the boundary line BL and the cutting edge line of the cutting edge C is designated L. A chip removed by the cutting edge CE is illustrated in a simplified way in the form of an arc line CH.

In all forms of chip removing machining in metal, including turning, the rule applies that the chip "is born curved", i.e., immediately after the moment of removal, the chip obtains an inherent aim at being curved. The shape of the chip, among others its radius of curvature, is determined by several factors the most important ones of which in connection with turning are the feed of the tool, the rake angle of the cutting edge and the cutting depth in question. After the removal, the chip will move perpendicularly to each infinitesimal part of the cutting edge. If the cutting edge is straight, the chip therefore becomes cross-sectionally flat or rectangular, but if the same is entirely or partly arched, also the chip becomes cross-sectionally entirely or partly arched.

In FIG. 1, it is shown how the chip CH is formed without impinging on the flank surface FS. This means that the chip is developed in an uncontrolled way without being directed. Such a chip most often curls into a long, telephone cord-like screw formation, which among other things may impinge on the generated surface of the workpiece or get entangled in the tool and/or the machine. In the example according to FIG. 1, the level difference H1 between the bearing surface SS and the cutting edge CE—or the height of the flank surface FS above the cutting edge CE—in relation to the distance L is too small for the chip to contact the flank surface FS.

In FIG. 2, a turning insert is shown, in which the level difference H2 between the bearing surface SS and the cutting edge CE (=the height of the flank surface) is considerably greater than in the preceding example, the flank surface FS sloping fairly steeply down toward the transition B to the chip surface CS. This means that the chip CH will dive into the flank surface FS with a great force, more precisely in a lower area of the same. The result of this will be that great amounts of heat are developed in the contact area, at the same time as the turning insert becomes blunt-cutting. In addition, the material of the chip may easily adhere to the flank surface FS, even all the way up to the bearing surface SS. After a certain time of use, also wear damage in the flank surface arises. Therefore, neither the embodiment according to FIG. 2 provides good chip control.

In FIG. 3, an embodiment is shown in which the conditions for good chip control are considerably improved. In this case, the height of the flank surface, i.e., the level difference H3 between the bearing surface SS and the cutting edge CE, is selected in such a way that the chip CH will carefully impinge on the flank surface FS in an upper area closest to the bearing surface SS. In such a way, the generation of heat and the tendencies to adhesion are reduced, whereby the easy-cutting properties of the turning insert are maintained. Not only the fact that the chip impinges on the flank surface FS by a moderate force, but also the fact that the distance between the cutting edge and the point of impact of the chip against the flank surface is greater than in FIG. 2 contributes to the moderate heat generation, whereby the temperature in the hot chip has time to be further reduced. When the level difference between the bearing surface and the cutting edge is selected in an optimal way, as is shown in FIG. 3, a good chip control is accordingly created, as will be described in more detail below.

A great difference between a cutting edge having a positive cutting geometry according to the above and a cutting edge having a negative cutting geometry is that the first-mentioned one lifts out the chip by being wedged in between the same and the generated surface, while the last-mentioned one pushes the chip in front of itself while shearing off the same. Generally, positive cutting edges will therefore be more easy-cutting than negative ones and produce chips having greater radii of curvature than the last-mentioned ones.

The turning insert known by U.S. Pat. No. 4,411,565 may be said to be a universal insert for many varying types of turning operations, and should per se have certain merits in connection with turning in general terms. Thus, in the patent document, it is asserted that the turning insert should be able to work within a wide area of cutting depths and feed rates, respectively, while minimizing heat wear of the turning insert and maximizing its service life. However, in practice, the known turning insert is not suitable for such delicate fine turning operations that allow successful machining of, for instance, jet engine rings of the above-mentioned type, among others for reasons mentioned below.

The continuous cutting edge of the turning insert formed by the nose edge and the two converging main edges according to U.S. Pat. No. 4,411,565 is formed with a negative cutting geometry in so far that the chip surface and the clearance surface, which together delimit the cutting edge, form an angle of 90° with each other, i.e., the rake angle=0°. This means that the cutting edge, on one hand, becomes strong but, on the other hand, considerably more blunt-cutting than a cutting edge having a positive cutting geometry. In addition, the same generates significant amounts of heat. A risk with negative, blunt-cutting cutting edges is furthermore that the same may dig into the machined material and interrupt an initiated pass. Another disadvantage is that the level difference between the reference plane in which the nose edges are situated and the lowest situated points of the main edges is many times greater than the level difference between the reference plane and the support surface of the turning insert. This means that the chip, in particular the part of the same that is removed along the fairly long and deeply situated section of the main edge, will impinge on the flank surface positioned inside the chip surface under appreciable heat generation (cf. FIG. 2 above), which may cause adhesion on the flank surface. Furthermore, the declining section of the main edge transforms into a lowest section via an angled, relatively abrupt bob, which may give rise to abrasive jet wear damage in the main edge.

By U.S. Pat. Nos. 5,000,626; 5,082,401; and 5,249,894 and EP 0730925, double-sided, indexable turning inserts having a plurality of cutting edges are previously known, which individually include a nose edge and two main edges. However, in this case, the main edges are straight and situated in the same plane as the nose edges, and therefore good chip control is not obtained.

The present invention aims at obviating the shortcomings of the turning insert known by U.S. Pat. No. 4,411,565 and others and at providing an improved, double-sided turning insert.

An object of the invention to provide an easy-cutting, double-sided turning insert having a good chip control and a reliable function during a service life, which is sufficient to carry out a pass without interruptions.

Another object of the invention is to provide a turning insert having many usable cutting edges that can be mounted in a stable way in the appurtenant tool irrespective of which side of the turning insert that is active and facing upward. Among other things, the turning insert should minimize the risk of metal particles compromising the stability by entering into the interface between the support surface and the corresponding bearing surface of the tool.

SUMMARY OF THE INVENTION

In an embodiment, the invention provides a double-sided, indexable turning insert having a polygonal basic shape, including at least three corners, and an upper side and an under side, in which first and second opposite, plane support surfaces are included, The plane support surfaces are delimited inside outer contour lines, and parallel to each other and to a neutral plane (NP) situated halfway between the plane support surfaces. A plurality of cutting edges are along the upper side and the under side, each one of which includes a nose edge and two main edges converging toward the nose edge, all nose edges along the individual upper or under side being situated in a common reference plane (RP) that is depressed in relation to the support surface. A circumferential chip surface is adjacent to a peripheral clearance surface, the individual main edge being formed between the chip surface and a part of the clearance surface extending between two corners, and the individual nose edge being between the chip surface and a convex part of the clearance surface. A flank surface, which slopes toward the chip surface, extends from the outer contour line of the support surface. The individual main edge, as viewed in side elevation, declines from a highest point adjacent to the nose edge toward a lowest point between two corners, a level difference between the support surface and the lowest point of the main edge amounts to at most 0.5 mm, and the rake angle ($\alpha$) of the individual cutting edge is acute along the entire extension of the cutting edge.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 4:
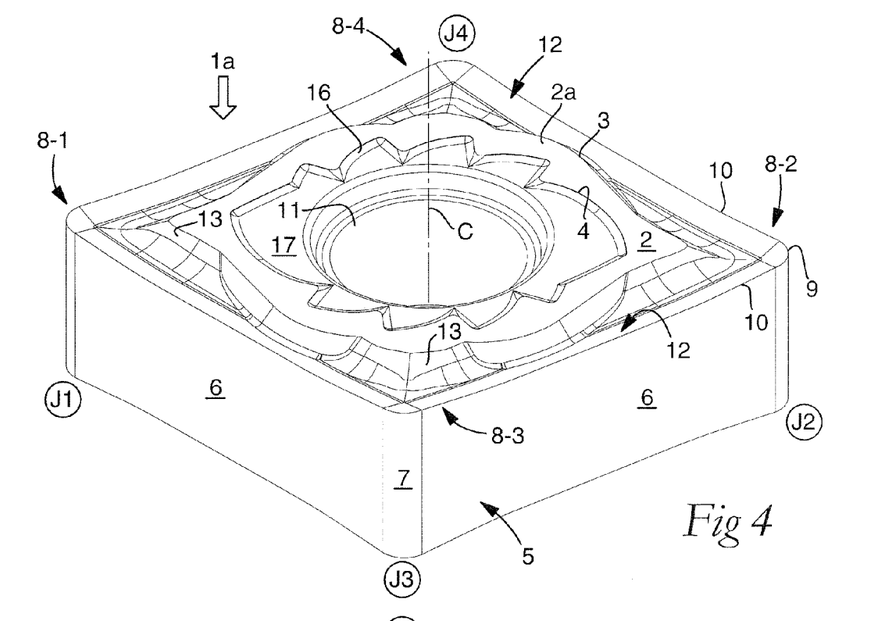
FIG. 4 is a top perspective view of a turning insert according to an embodiment of the invention.
Figure 5:
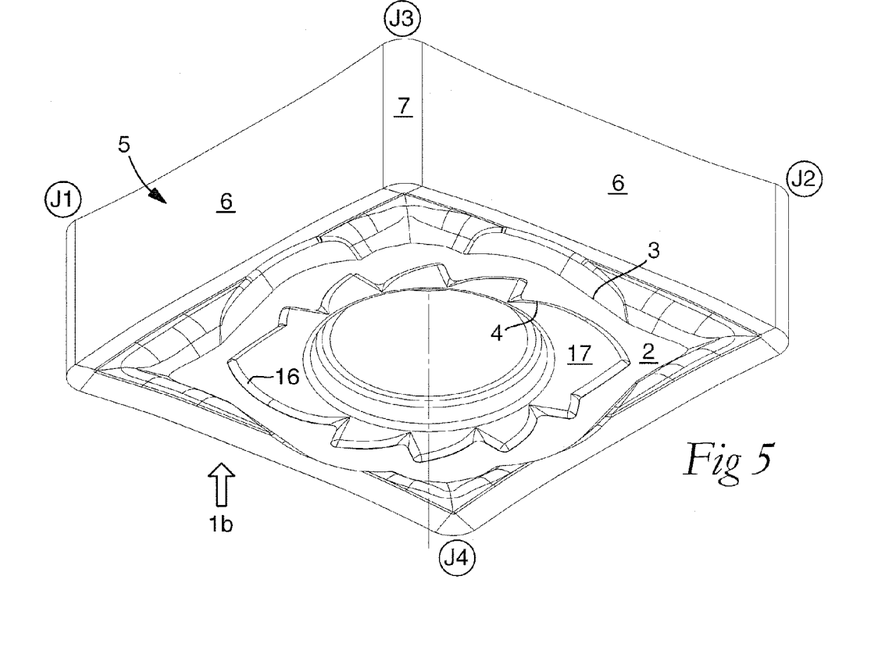
FIG. 5 is a bottom perspective view of the same turning insert.

In FIGS. 4 and 5, it is seen that the turning insert according to an embodiment of the invention has a polygonal basic shape and includes an upper side 1a and an under side 1b of an identical design. For this reason, henceforth primarily only the upper side 1a will be described in detail. In the upper and under sides 1a, 1b, a pair of opposite, plane support surfaces 2 are included, which are delimited between outer and inner contour lines 3, 4, and which are parallel to each other as well as to a neutral plane NP (see FIGS. 7 and 8) situated halfway between the same. The flatness of the support surfaces may advantageously be provided by grinding, but also in another way, for instance direct pressing or sparking. In the example, the turning insert is rhombic and includes four corners J1, J2, J3 and J4, which are pair-wise opposite each other. At the two corners J1, J2, the turning insert is acute-angled, while the corners J3, J4 are obtuse-angled. Although the corner angles may vary, the acute angles are in this case 80° and the obtuse angles 100°.

Between the upper and under sides 1a, 1b, a circumferential clearance surface extends generally designated 5, which includes a plurality of part surfaces, viz. on one hand four plane part surfaces 6, which individually extend between a pair of corners, and on the other hand four convex part surfaces 7, which are situated in the corners and form transitions between adjacent clearance part surfaces 6.

Along the individual upper and under side, respectively, a plurality of (in this case four) cutting edges are formed, which are generally designated 8-1, 8-2, 8-3 and 8-4, and each one of which includes a nose edge 9 and two main edges 10 converging toward the same. Each such main edge 10 has the purpose of providing for the principal chip removal, while the common nose edge 9 has the purpose of wiping off the generated surface irrespective of which one of the two main edges 10 that is active. Although the exemplified turning insert includes four usable cutting edges 8 along the upper side as well as the under side, it is per se possible to form the same with only two usable, diametrically opposed cutting edges, which preferably are located in the acute-angled corners J1, J2.

Figure 6:
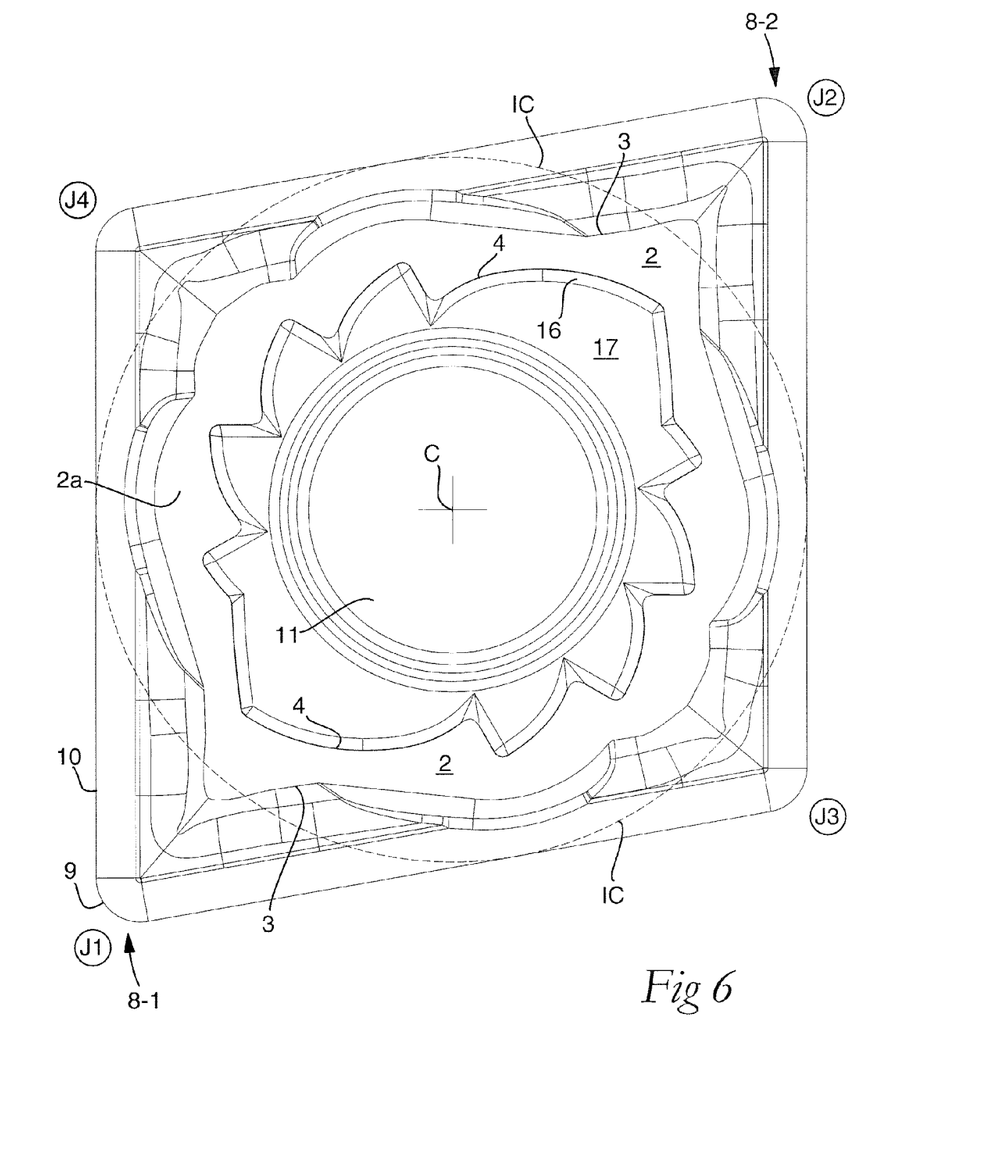
FIG. 6 is an enlarged planar view of the turning insert according to FIGS. 4 and 5.

In FIGS. 4 and 5, it is furthermore seen that the turning insert includes a central, through hole 11, the geometrical center axis of which is designated C. It is axiomatic that the two corners J1 and J2 are equidistantly spaced-apart from the center axis C. Also the radial distances between the center axis C and the two corners J3, J4 are equally large, although shorter than the distances to the corners J1, J2. For the sake of completeness, it should also be mentioned that the height or thickness of the turning insert is considerably smaller than its IC measure (see FIG. 6). Usually, the IC measure is in the range of 10-20 mm, while the thickness is less than half of the IC measure. In the shown embodiment, the turning insert has an IC measure of 12 mm, and a thickness t (see FIG. 8) of 4.88 mm.

Immediately inside the clearance surface 5 (see FIG. 4), a circumferential chip surface generally designated 12 extends. Between this chip surface 12 and the outer contour line 3 of the support surface 2, a flank surface 13 extends, which slopes downward toward the chip surface. The chip surface 12 as well as the flank surface 13 includes a number of part surfaces, which will be described in more detail below.

Figure 7:
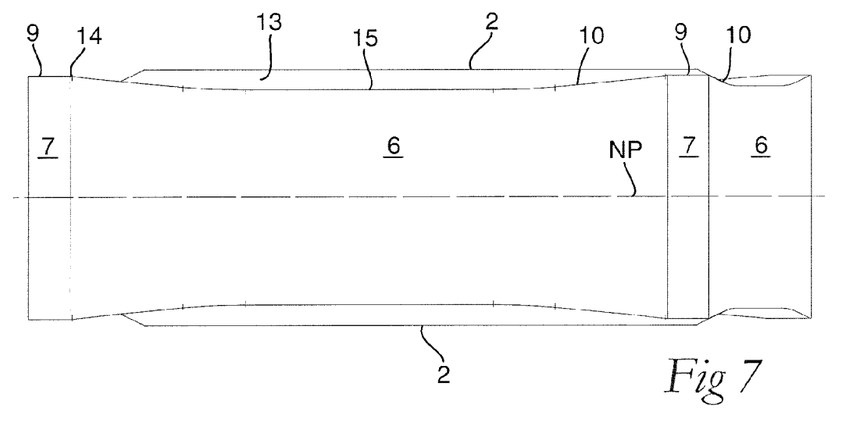
FIG. 7 is a side view of the turning insert.
Figure 8:
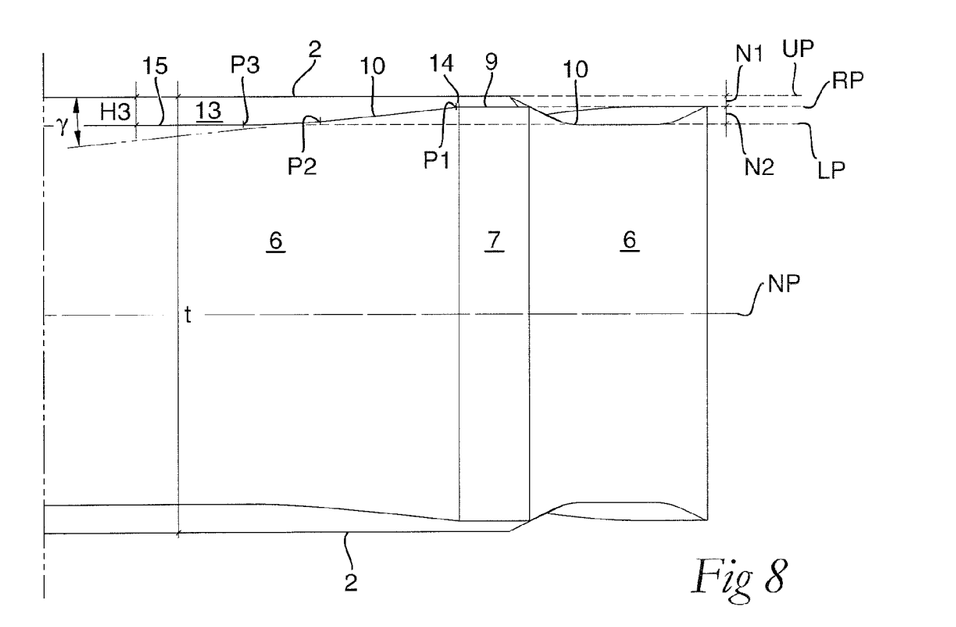
FIG. 8 is a sectioned side view on an enlarged scale.

Reference is now made to FIGS. 7 and 8, it is seen that the individual main edge 10—as viewed in side elevation—declines or falls down from a highest point or top point 14 adjacent to the individual nose edge 9 toward a lowest point or bottom point designated 15.

In FIG. 8, UP designates an upper plane, in which the individual support surface 2 is situated, while RP designates a reference plane, in which all four nose edges 9 are mutually situated. In addition, LP designates a lower plane, in which the lowest sections or bottom points 15 of the main edges 10 are jointly situated. It is evident that the planes UP, RP and LP are parallel to the neutral plane NP and that the plane RP is depressed in relation to the plane UP, as well as the plane LP is depressed in relation to the reference plane RP.

In the example shown, the support surface 2 is included in a generally ring-shaped or endless land, which, in addition to the support surface 2 and the outer flank surface 13, is delimited by an inner flank surface 16 that extends between the inner contour line 4 of the support surface 2 and a depressed, plane central surface 17. In this case, the generally ring-shaped surface 2 forms a primary support surface that constitutes the only support surface of the individual upper or under side. In the shown, preferred embodiment, the inner flank surface 16 is formed with a number of saw tooth-shaped notches, which contribute to reducing the area of the support surface 2 (without affecting the proximity of the outer flank surface 13 to the periphery of the turning insert). In such a way, the risk of stability deteriorating metal particles being jammed between the support surface and the co-operating bearing surface of the tool is minimized.

Figure 11:
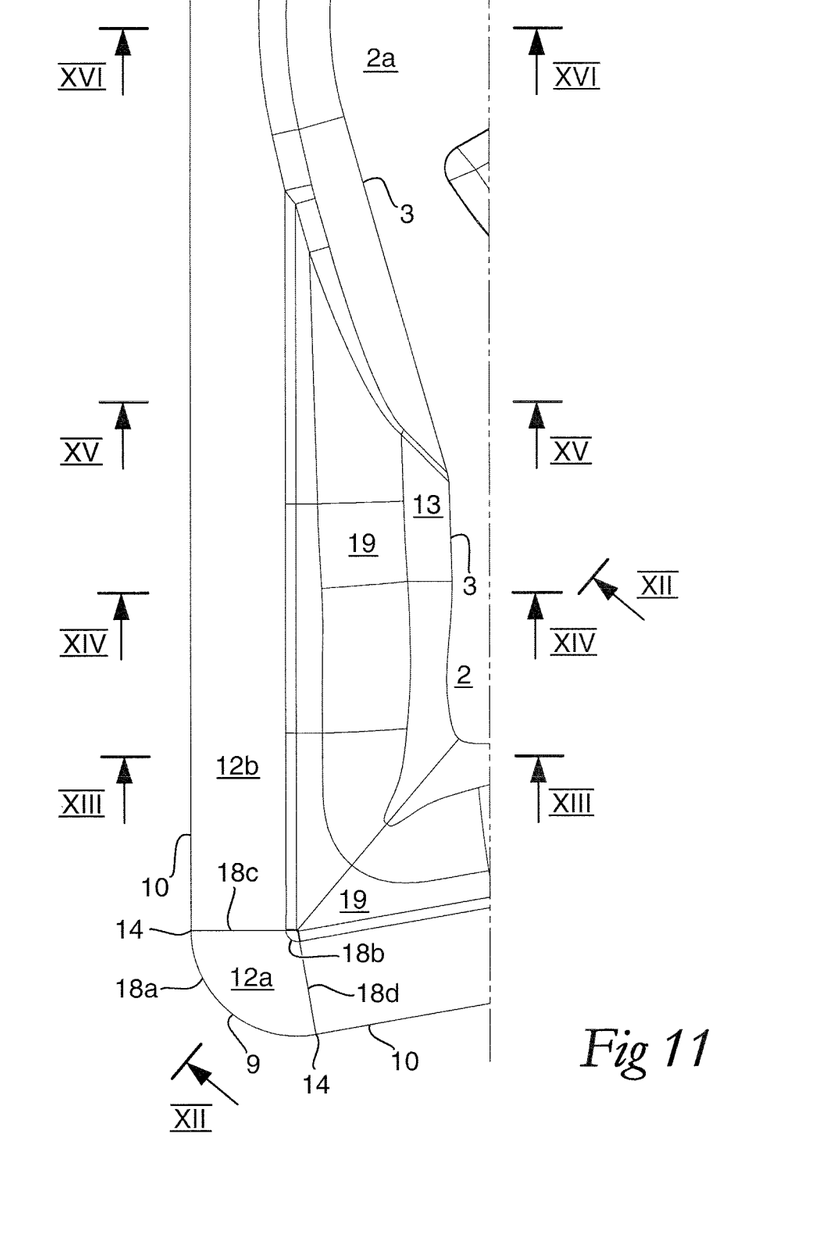
FIG. 11 is an enlarged detailed view in plane elevation showing the turning insert in the area of an acute-angled corner.
Figure 12:
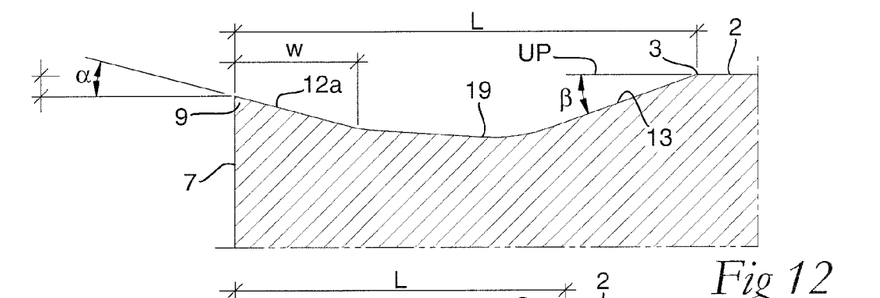
FIGS. 12-16 are detailed sections XII-XII, XIII-XIII, XIV-XIV, XV-XV and XVI-XVI in FIG. 11.
Figure 13:
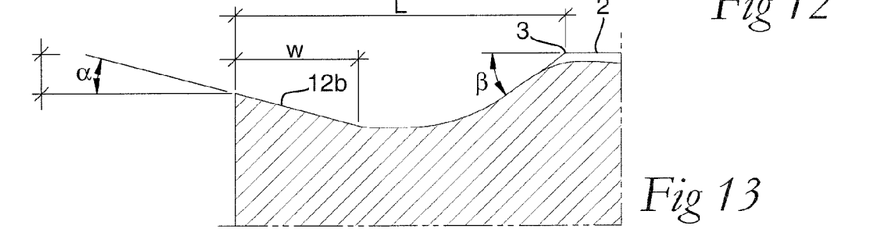
Figure 14:
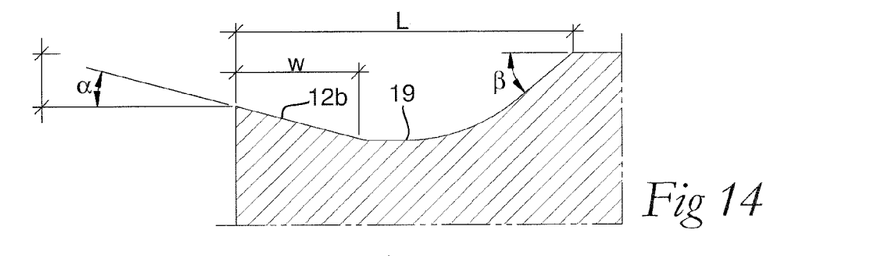
Figure 15:
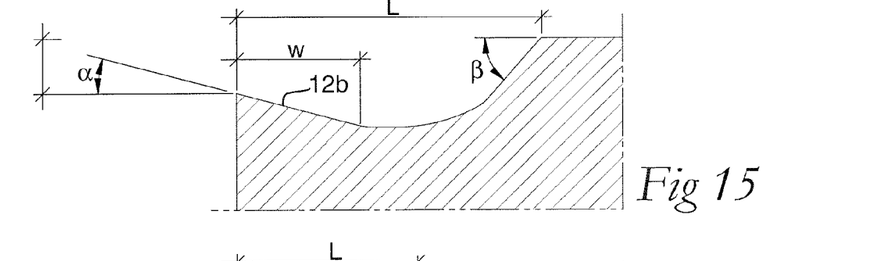

Reference is now made to FIGS. 11-16, FIG. 11 of which is an enlarged detailed planar view of the turning insert adjacent to an acute-angled corner (J1 or J2). The nose edge 9 is delimited by, on one hand, the convex part 7 of the clearance surface 5, and, on the other hand, a generally circular sector-shaped section of the chip surface 12, viz. the section that in FIG. 11 is designated 12a. This surface section 12a is contained between the outer circular arc line 18a, which forms the cutting edge line of the nose edge, as well as an inner circular arc line 18b, besides which two radial lines 18c, 18d define the two ends of the chip part surface 12a. Although the cutting edge line 18a is located in the reference plane RP, the part surface 12a slopes downward/inward from the cutting edge line 18a toward the inner boundary line 18b. This is seen in FIG. 12, which illustrates how the surface 12a has a width W (in plane elevation) as well as a rake angle designated α, which in the example amounts to 15°. The part of the chip surface 12 that connects to a plane clearance part surface 6 and, together with the same, delimits a main edge 10 is designated 12b.

In the section XII-XII (see FIG. 12), which is located in a vertical plane that coincides with the bisector between the converging main edges 10, the distance L between the nose edge 9 and the outer contour line 3 of the support surface 2 is fairly great in comparison with the width W of the chip surface 12a. A transition (in the form of a concave bottom surface) between the flank surface 13 and the chip surface 12a is designated 19. The angle β (henceforth denominated flank angle) formed by the flank surface 13 with the plane UP is moderate and amounts in the example to approx. 20°.

In the shown, preferred embodiment, the rake angle α is constant (15°) along the entire extension of the individual cutting edge, while, however, the flank angle β varies most considerably. In the section XIII-XIII (see FIG. 13), the flank angle β amounts to approx. 35°. Furthermore, the distance L between the nose edge 9 and the outer contour line 3 of the support surface 2 is somewhat smaller than in the section according to FIG. 12. In the sections XIV-XIV and XV-XV, the flank angle β amounts to approx. 40° and 48°, respectively. In other words, the flank angle β increases with increasing distance from the nose edge 9.

Figure 16:
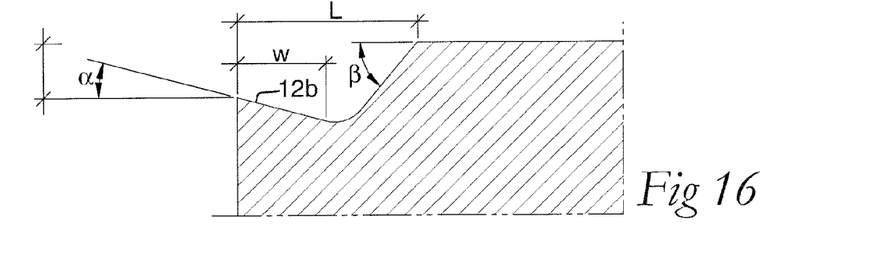

In the shown, preferred embodiment, the chip surface 12b of the individual main edge 10 has not a uniform width, but tapers in an area at a distance from the appurtenant nose edge 9. This is seen in FIGS. 11 and 16, which show how the chip surface 12b in the section XVI-XVI has a width W that is considerably smaller than the sections along the part of uniform width of the chip surface 12b. By the fact that the chip surface has been tapered in this way, a peninsular part 2a of the support surface 2 has been possible to be enlarged nearer the main edge 10 (see also FIGS. 4-6). As is most clearly seen in FIG. 6, each bulging support part surface 2a is situated somewhat nearer an obtuse-angled corner (J3, J4) than an acute-angled corner (J1, J2). By means of these bulging support part surfaces 2a, the stability of the turning insert is significantly improved in connection with the individual, acute-angled cutting edge 8-1, 8-2 being active. With continued reference to FIG. 6, it should be pointed out that the two peninsular support part surfaces 2a, which participate in supporting the acute-angled cutting edge 8-1 laterally, are situated nearer said cutting edge 8-1 than an imaginary diagonal line (not shown) between the obtuse corners J3, J4. By the fact that the support part surfaces 2a are comparatively widely separated, a rigid support of the turning insert is obtained when the cutting edge 8-1 is active.

Figure 9:
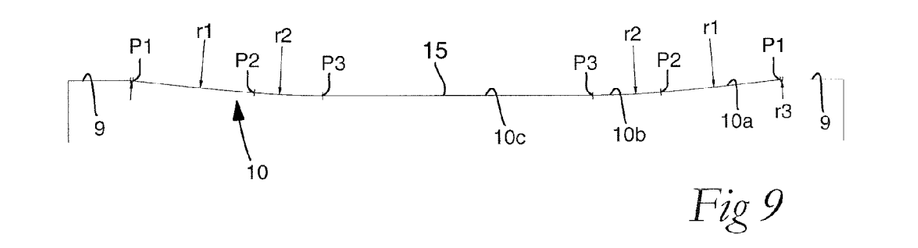
FIG. 9 is a schematic side view of a cutting edge line along a side of the turning insert.
Figure 10:
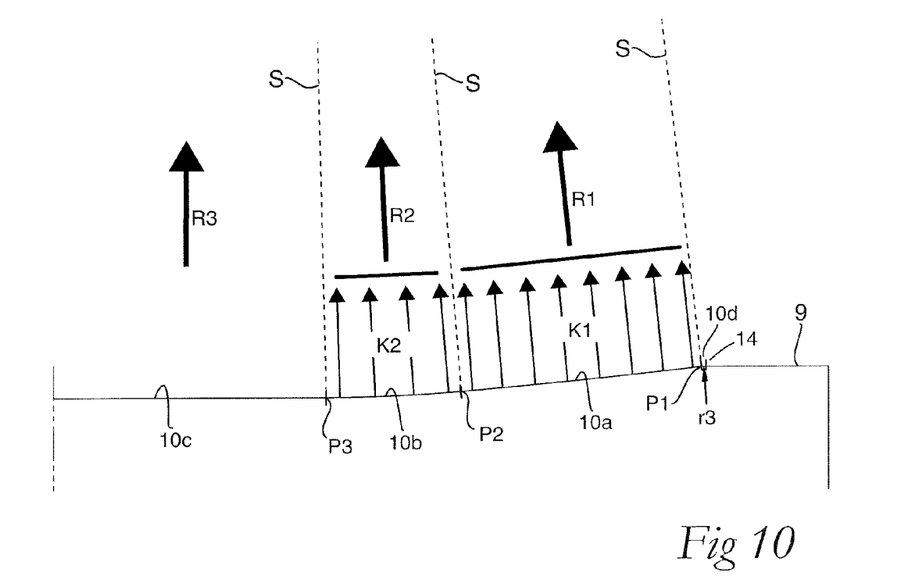
FIG. 10 is an enlarged side view of a part of the cutting edge line according to FIG. 9.

Reference is now made to FIGS. 9 and 10, which, on one hand, illustrate how the two main edges 10, which co-operate with each nose edge 9, are integrated along a single, continuous cutting edge line that extends between the end points 14 (=the top end points), and on the other hand how said cutting edge line has a smooth, billowy shape without any abrupt irregularities or bobs. This smooth shape has been provided by the individual main edge 10 having been formed of a plurality of part edges 10a, 10b, 10c and 10d, which all transform into each other via transition points P1, P2 and P3, in which the part arcs are tangent to each other. Among these part edges, the part edges 10a and 10b have a concave arc-shape, while the middle and lowest situated part edge 10c along the cutting edge line is straight. The concave part edge 10a, which extends between the points P1 and P2, has a radius r1 that generally is greater than the radius r2 of the trailing part edge 10b, which extends in an arched way between the points P2 and P3. In the embodiment, r1 amounts to 50 mm and r2 10 mm. Between the part edge 10a and the end point 14 of the nose edge 9, in addition a very short, convex part edge 10d extends having the radius r3 (=0.75 mm). The last-mentioned, convex part edge 10d has only the purpose of forming a non-sharp transition between the part edge 10a and the nose edge 9. In FIG. 10, it is shown how infinitesimal force components K1, which remove a chip along the part edge 10a, are integrated into a force resultant R1, which is directed obliquely upward/rearward from the turning insert. In an analogous way, infinitesimal force components K2 are integrated along the part edge 10b into a force resultant R2, which also is directed obliquely upward/rearward, although at a somewhat smaller angle than the resultant R1. Should the cutting depth be sufficiently great, also a chip removal occurs along the middle part edge 10c. Because this is straight and situated in the plane LP, a force resultant R3 in this part of the chip will be directed at a right angle upward from the turning insert. Irrespective of the cutting depth, at all events the total, resulting force, which guides the chip out from the cutting edge, will however be directed generally obliquely upward/rearward.

The fact that the different part edges 10a, 10b, 10c and 10d are tangent to each other in the transition points P1, P2 and P3 is based on each imaginary radial line S, which intersects a transition point between adjacent, arched part edges extending to the centers (not shown) of the respective circular arcs. An imaginary radial line S from the transition point P2, which extends to the center of the concave part arc 10b, accordingly also extends from the point P2 to the center of the part arc 10a. In an analogous way, a line S perpendicular to the straight part edge 10c, which line intersects the point P3, extends to the center of the part arc 10b.

By the fact that the cutting edge line in the above described way has been given a smoothly billowy shape without sharp bobs, the emergence of abrasive jet wear damage is counteracted in an effective way. In other words, the smooth arc-shape of the cutting edge line contributes to a service life that ensures that the cutting edge in question can be used during a continuous pass without interruptions.

In the example, where the turning insert has an IC measure of 12 mm and a thickness t of approx. 4.9 mm, the distance L (see FIG. 12) between the nose edge 9 and the outer contour line 3 of the support surface 2 amounts to approx. 2.7 mm, the sector-shaped chip part surface 12a having a width W (as seen in plane elevation) of approx. 0.7 mm. Also the chip part surface 12b of the main edge has the same width W=0.7 mm in the sections XIII-XIII, XIV-XIV and XV-XV, in which, however, the distances L vary somewhat. Thus, in the section XIII-XIII, L amounts to approx. 1.9 mm, in the section XIV-XIV to approx. 2.0 mm, and in the section XV-XV approx. 1.8 mm. However, in the section XVI-XVI, the width W is reduced to approx. 0.4 mm and the distance L to approx. 1.0 mm. This means that the aforementioned, peninsular support part surface 2a has been possible to be enlarged approx. 0.8 mm laterally.

With reference to FIGS. 7 and 8, it should furthermore be pointed out that the level difference N1 between the plane UP of the support surface 2 and the reference plane RP amounts to 0.12 mm and the level difference N2 between the lower plane LP, in which the lowest section 15 of the main edge is situated, to 0.20 mm. Therefore, the height H3 of the flank surface 13 (cf. FIG. 3) amounts to 0.32 mm (0.12+0.20). Although H3 may vary (by variation of the level differences N1 and N2), H3 must not be more than 0.5 mm. In other words, the height of the flank surface H3 is maximized to approx. 10% of the thickness t of the turning insert.

The angle γ (the fall angle), at which the main edge 10 declines from the nose edge 9, should amount to at least 3° and at most 10°. In the example, γ amounts to 7°. This fall angle is defined as the angle between the reference plane RP and a chord between the points P1 and P2.

Figure 17:
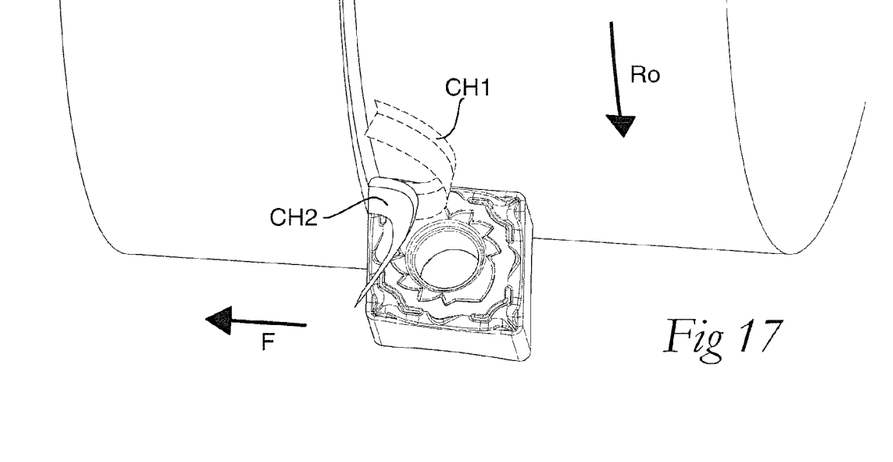
FIG. 17 is an enlarged perspective view showing the turning insert during the turning of a workpiece.

Reference is now made to FIG. 17, which illustrates the turning insert according to an embodiment of the invention during the turning of a workpiece rotating in the direction of rotation Ro, at the same time as the turning insert mounted in a tool (not shown) is longitudinally fed in the feeding direction F. By dash-dotted lines, a chip CH1 is shown that hypothetically is generated by a cutting edge, the main edges of which are straight and situated in a common plane (compare with the turning inserts according to U.S. Pat. Nos. 5,000,626; 5,082,401; and 5,249,894 and EP 0730925). In this case, the chip gets a cross-sectionally flat shape and curls up perpendicular to the main edge. Therefore, the risk is great that the chip will impinge on the generated surface of the workpiece. By solid lines, a chip CH2 is shown, which is removed by means of the turning insert according to an embodiment of the invention. This chip will initially be directed obliquely rearward along the cutting edge line of the main edge and then gentle impinge on the flank surface 13, which guides the chip in the direction obliquely rearward. When the same (after having begun to be curved and cooled considerably) after that impinges on the turning insert further back along the cutting edge line, the same will be broken in pieces into smaller fragments.

Figure 18:
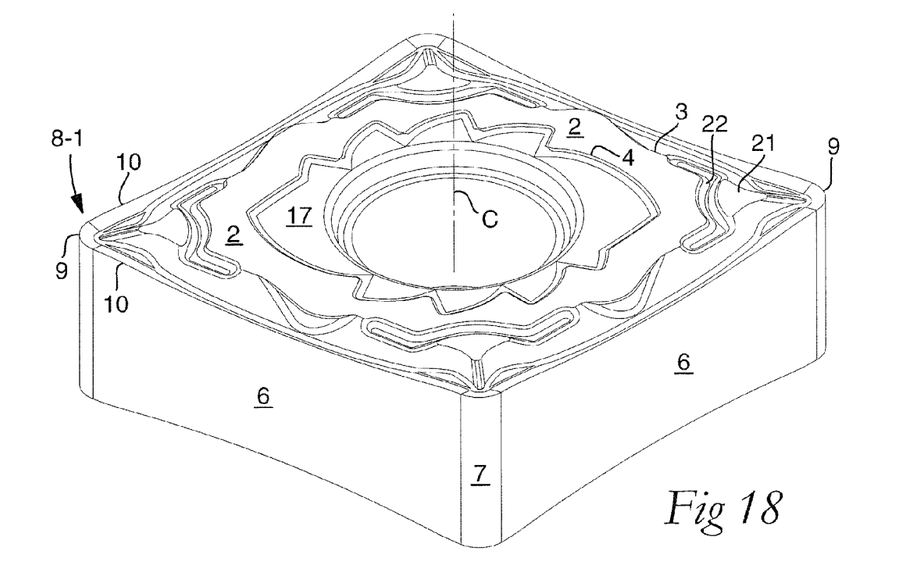
FIG. 18 is a perspective view of an alternative embodiment of the turning insert according to the invention.

In FIG. 18, an alternative embodiment of the turning insert according to the invention is shown. In this case, the generally ring-shaped land, in which the support surface 2 is included, is supplemented with four island-like lands, each one of which includes a secondary support surface 21 situated in the same plane as the primary support surface 2. This secondary support surface 21 is placed between the individual nose edge 9 and the primary support surface 2, and has in this case a bicycle saddle-like contour shape having a tapering tip pointing toward the nose edge. By the fact that the island-like land, in which the secondary support surface 21 is included, is spaced-apart from the land in which the primary support surface 2 is included, more precisely via a chute 22, the risk of chip fragments or other hard particles entering between the support surface and the co-operating bearing surface of the turning tool is further minimized. In other words, the presumptions are optimized for a stable fixation of the turning insert in the tool.

By combining, in accordance with the invention, cutting edges having a positive cutting geometry with chip-guiding flank surfaces or flanks, the height of which in relation to the chip-removing main edges is limited to at most 0.5 mm, an easy-cutting turning insert is obtained having a uniquely good chip control. Thus, the moderate flank height, in co-operation with the fact that the main edge declines at a considerable fall angle from the nose edge, ensures that the removed chip—irrespective of the selected cutting depth—impinges on the flank surface by a moderate force and is gently directed away in the direction obliquely rearward so as to—as is shown in FIG. 17—during its simultaneous progressing curling finally be broken in pieces into easily manageable fragments, usually in the form of co-called "comas". The chip control becomes particularly good when the turning is carried out at a moderate feed (e.g., in the range of 0.1-0.3 mm per revolution) while generating relatively thin chips. Furthermore, the smooth or even cutting edge line along the main edge, which is attained by the part edges thereof transforming in tangent into each other, counteracts the emergence of abrasive jet wear damage to the main edge. In the preferred embodiments, which are illustrated in the drawings, the peninsular enlargements of the support surface to the immediate proximity of the main edges ensure moreover that the bearing width of the turning insert, and thereby its stability, becomes extraordinary good. In addition, the contact area of the ring-shaped support surface has been reduced to a minimum thanks to the saw tooth-shape of the inner contour line. In such a way, the danger of the stabilizing particles penetrating into the interface between the support surface of the turning insert and the bearing surface of the tool is minimized. In all, the turning insert according to the invention is accordingly ensured a service life that with a margin manages one pass without detrimental interruptions, the generated surface of, e.g., rings of the type initially mentioned becoming smooth and meticulously dimensionally accurate.

While the invention has been disclosed with reference to certain preferred embodiments, numerous modifications, alterations, and changes to the described embodiments are possible without departing from the sphere and scope of the invention, as defined in the appended claims and their equivalents thereof. Thus, the invention may be applied to double-sided turning inserts having any polygonal basic shape, in particular triangular. In the examples shown, the clearance part surfaces in the corners of the turning insert are cylindrical, i.e., generatrices along the same extend perpendicular to the neutral plane, besides which the clearance part surfaces along the main edges are plane so far that horizontal as well as vertical, imaginary lines along the same are straight. However, it is also possible to form the circumferential clearance surface with a reduced waist. Accordingly, it is intended that the invention not be limited to the described embodiments, but that it have the full scope defined by the language of the following claims.

What is claimed is:

1. A double-sided, indexable turning insert having a polygonal basic shape, comprising:
    at least three corners;
    an upper side and an under side, in which first and second opposite, plane support surfaces are included, the plane support surfaces being delimited inside outer contour lines, and parallel to each other and to a neutral plane (NP) situated halfway between the plane support surfaces;
    a plurality of cutting edges along the upper side and the under side, each one of which includes a nose edge and two main edges converging toward the nose edge, all nose edges along the individual upper or under side being situated in a common reference plane (RP) that is depressed in relation to the support surface;
    a circumferential chip surface adjacent to a peripheral clearance surface, the individual main edge being formed between the chip surface and a part of the clearance surface extending between two corners, and the individual nose edge being between the chip surface and a convex part of the clearance surface; and
    a flank surface, which slopes toward the chip surface, extending from the outer contour line of the support surface, wherein
    the individual main edge, as viewed in side elevation, declines from a highest point adjacent to the nose edge toward a lowest point between two corners,
    a level difference between the support surface and the lowest point of the main edge amounts to at most 0.5 mm, and
    the rake angle ($\alpha$) of the individual cutting edge is acute along the entire extension of the cutting edge.

2. The turning insert according to claim 1, wherein a level difference (N2) between the reference plane (RP) and the lowest point of the main edge is at most twice as large as a level difference (N1) between the support surface and the reference plane (RP).

3. The turning insert according to claim 1, wherein the rake angle ($\alpha$) of the cutting edge is constant along both the nose edge and the two main edges.

4. The turning insert according to claim 1, wherein the rake angle ($\alpha$) of the cutting edge amounts to at least 5° and at most 20°.

5. The turning insert according to claim 1, wherein from the nose edge, the individual main edge declines at a fall angle ($\gamma$) in the range of 3-10° in relation to the reference plane (RP).

6. The turning insert according to claim 1, wherein the individual main edge includes a plurality of part edges, which transform into each other via transition points in which the part edges are tangent to each other.

7. The turning insert according to claim 1, wherein the chip surface along the individual main edge tapers toward an area, inside which the support surface is enlarged by a peninsular part surface.

8. The turning insert according to claim 1, wherein the individual upper or under side, in addition to a generally ring-shaped land, in which the primary support surface is included, includes an island-like land, which is spaced-apart from the ring land and placed between the ring land and the nose edge, as well as includes a secondary support surface situated in the same plane as the primary support surface.

9. The turning insert according to claim 8, wherein the secondary support surface has a bicycle saddle-like contour shape having a tapering tip pointing toward the nose edge.

10. The turning insert according to claim 1, wherein the flank angle ($\beta$) of the flank surface increases with increasing distance from the nose edge.

* * * * *